(12) United States Patent
Ha et al.

(10) Patent No.: US 7,656,473 B2
(45) Date of Patent: Feb. 2, 2010

(54) FABRICATION METHOD OF LIGHT CONTROLLING ASSEMBLY AND LIQUID CRYSTAL DISPLAY DEVICE

(75) Inventors: Ju-hwa Ha, Seoul (KR); Jin-soo Kim, Seoul (KR); Jung-wook Paek, Suwon-si (KR); Byung-yun Joo, Seoul (KR); Min-young Song, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 238 days.

(21) Appl. No.: 11/776,033

(22) Filed: Jul. 11, 2007

(65) Prior Publication Data

US 2008/0049166 A1 Feb. 28, 2008

(30) Foreign Application Priority Data

Jul. 14, 2006 (KR) ...................... 10-2006-0066379

(51) Int. Cl.
*G02F 1/1335* (2006.01)
(52) U.S. Cl. ....................................................... 349/64
(58) Field of Classification Search .................. None
See application file for complete search history.

(56) References Cited

U.S. PATENT DOCUMENTS

| | | | |
|---|---|---|---|
| 5,701,008 A * | 12/1997 | Ray et al. | 250/352 |
| 6,488,417 B2 * | 12/2002 | Kropp | 385/88 |
| 2002/0186922 A1 * | 12/2002 | Hananaka | 385/33 |
| 2003/0227768 A1 * | 12/2003 | Hara et al. | 362/31 |
| 2006/0061708 A1 * | 3/2006 | Umebayashi et al. | 349/95 |
| 2006/0291777 A1 * | 12/2006 | Nishizawa et al. | 385/33 |

\* cited by examiner

*Primary Examiner*—Tina M Wong
(74) *Attorney, Agent, or Firm*—F. Chau & Associates, LLC

(57) ABSTRACT

A liquid crystal display comprises a liquid crystal display panel; a light source to provide light to the liquid crystal display panel; and a light controlling assembly disposed between the light source and the liquid crystal display panel, the light controlling assembly comprising at least one first light controlling member, at least one second light controlling member disposed on the first light controlling member and an light curing agent disposed on an edge part between the first light controlling member and the second light controlling member to adhere the first light controlling member and the second light controlling member to each other, the first light controlling member and the second light controlling member having an air layer therebetween.

14 Claims, 17 Drawing Sheets

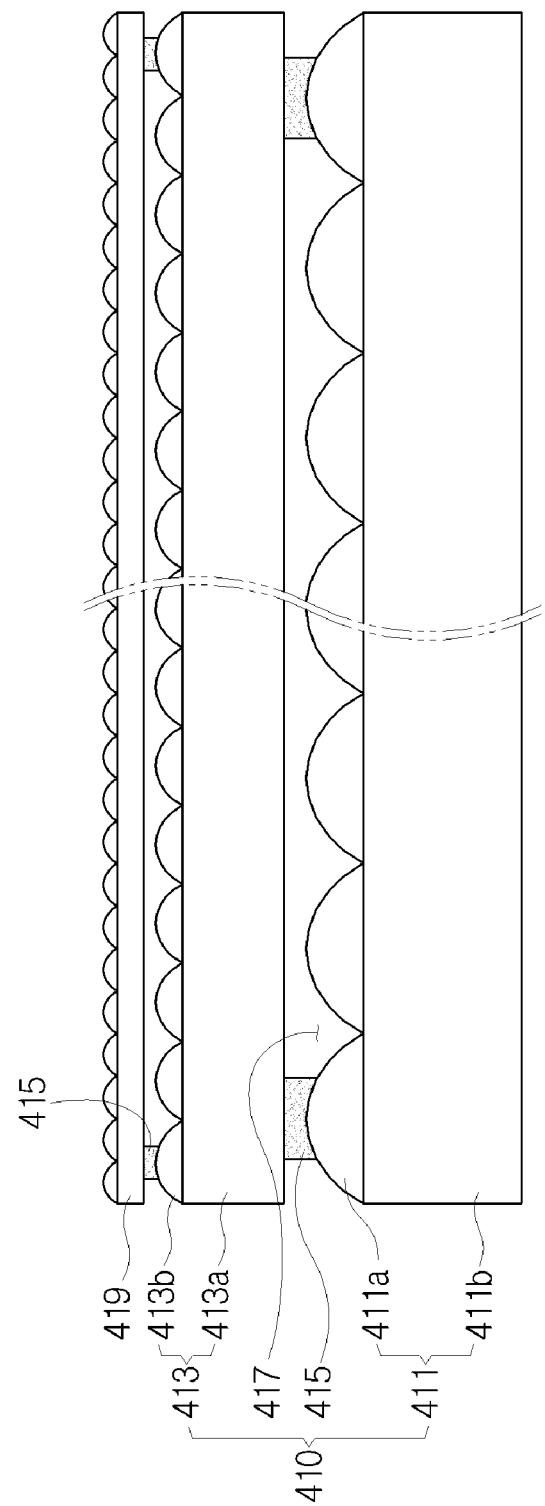

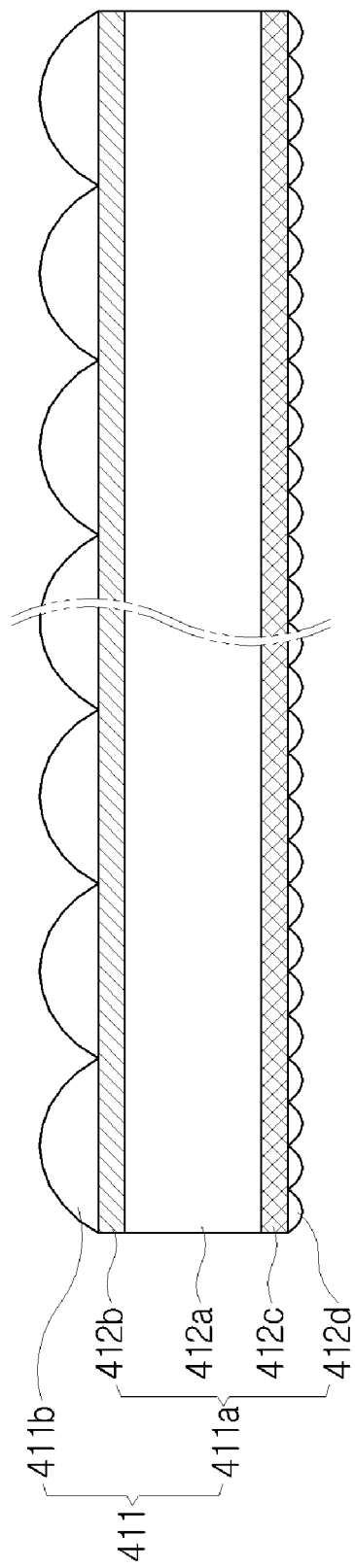

FABRICATION METHOD OF LIGHT CONTROLLING ASSEMBLY AND LIQUID CRYSTAL DISPLAY DEVICE

CROSS-REFERENCE TO RELATED APPLICATION

This application claims priority to Korean Patent Application No. 2006-0066379, filed on Jul. 14, 2006, the disclosure of which is hereby incorporated by reference herein in its entirety.

BACKGROUND OF THE INVENTION

1. Technical Field

The present disclosure relates to a light controlling assembly, a fabrication method of the same and a liquid crystal display having the same, and more particularly, to a light controlling assembly to improve brightness and to be readily employed in an automated process, a fabrication method of the same and a liquid crystal display having the same.

2. Discussion of the Related Art

A liquid crystal display (LCD) typically comprises an LCD panel which has a TFT substrate, a color filter substrate and a liquid crystal layer disposed therebetween. The LCD panel does not emit light by itself. Thus, a backlight unit is disposed behind the LCD panel for providing light.

A backlight unit for an LCD panel typically comprises a light source to provide light to the LCD panel and a light controlling member disposed between the light source and the LCD panel which collects and diffuses light from the light source to be provided to the LCD panel. The light controlling member comprises a diffusing plate diffusing light which is to be enhanced in uniformity, a collecting film allowing the light passing through the diffusing plate to progress perpendicularly to enhance the brightness of the light and a reflective polarizing film which reflects and polarizes the light. However, the collecting film and the reflective polarizing film are usually thin, and thus it may difficult to treat them in an automated process. Thus, to avoid the above-mentioned difficulties which may be encountered in connection with automated processes, each element of the light controlling member should be adhered to each other by an adhesive agent such that the light controlling member is provided as a single body or unit, and then subsequently treated.

However, even with the above design for the light controlling member, the brightness of the light passing through the light controlling member may still decrease due to the adhesive agent disposed between the elements of the light controlling member.

Thus, there is a need for a light controlling assembly which may improve the brightness of light and which may be readily employed in an automated process. There is also a need for a fabrication method of the same and an LCD having the same.

SUMMARY OF THE INVENTION

Embodiments of the present invention provide a light controlling assembly to improve brightness of light and to be readily employed for an automated process, a fabrication method of the same and an LCD having the same.

In accordance with an embodiment of the present invention, a liquid crystal display is provided. The liquid crystal display comprises a liquid crystal display panel; a light source to provide light to the liquid crystal display panel; and a light controlling assembly disposed between the light source and the liquid crystal display panel, the light controlling assembly comprising at least one first light controlling member, at least one second light controlling member disposed on the first light controlling member and an light curing agent disposed on an edge part between the first light controlling member and the second light controlling member to adhere the first light controlling member and the second light controlling member to each other, the first light controlling member and the second light controlling member having an air layer therebetween.

According to an embodiment of the present invention, the first light controlling member comprises a transparent base and light collecting parts provided on one surface of the base toward the liquid crystal display panel, the light collecting parts being disposed parallel to each other, extending in one direction, and comprising one of convex or triangular cross sections.

According to an embodiment of the present invention, the second light controlling member comprises the same configuration as the first light controlling member and is different from the first light controlling member in the length of a bottom side of the cross section of the light collecting parts.

According to an embodiment of the present invention, the base comprises a core layer and an antistatic layer formed between the core layer and the light collecting parts.

According to an embodiment of the present invention, the base further comprises an ultraviolet blocking layer which faces the light source and is disposed on a lower surface of the core layer.

According to an embodiment of the present invention, a plurality of protrusions is further formed on one surface of the base facing the light source.

According to an embodiment of the present invention, a thickness of the base is in a range from about 1 millimeter (mm) to about 1.6 mm.

According to an embodiment of the present invention, the light curing agent comprises infrared curing agent.

According to an embodiment of the present invention, the infrared curing agent is formed by being cured by light ray having a wavelength of 400 nanometer (nm) to 800 nanometer (nm) and heated over about 400° C. in temperature.

According to an embodiment of the present invention, the light curing agent is discontinuously formed.

According to an embodiment of the present invention, at least a portion of the light source extends in one direction, and the light collecting parts are disposed parallel with an extending direction of the light source.

According to an embodiment of the present invention, the second light controlling member comprises a lower second light controlling member which faces the first light controlling member and a upper second light controlling member, the light controlling assembly further comprises an additional light curing agent disposed on an edge part of the lower light controlling member and the upper light controlling member and at least a part of the light curing agent does not overlap the addditonal light curing agent.

According to an embodiment of the present invention, the second light controlling member comprises a lower second light controlling member which faces the first light controlling member and a upper second light controlling member, the light controlling assembly further comprises an additional light curing agent disposed on an edge part of the lower light controlling member and the upper light controlling member and the light curing agent and the addditonal light curing agent have different width.

According to an embodiment of the present invention, the second light controlling member comprises a lower second light controlling member which faces the first light controlling member and a upper second light controlling member, the upper second light controlling member comprising a micro array lens and the light controlling assembly further comprises an additional light curing agent disposed on an edge part of the lower light controlling member and the upper light controlling member.

In accordance with an embodiment of the present invention, fabrication method of a light controlling assembly is provided. The fabrication method of a light controlling assembly comprises preparing at least one first light controlling member; forming an light curing agent on an edge part of the first light controlling member; depositing at least one second light controlling member on one surface of the first light controlling member where the light curing agent is formed; and pressing the first light controlling member and the second light controlling member to be closer to each other by irradiating the light curing agent with light rays.

According to an embodiment of the present invention, the first light controlling member comprises a first transparent base and first light collecting parts disposed on one surface of the first base.

According to an embodiment of the present invention, the second light controlling member comprises at least one of a diffusing film, a reflective polarizing film and a light collecting film.

According to an embodiment of the present invention, the second light controlling member comprises a second transparent base and second light collecting parts disposed on one surface of the second base, and an interval between the second light collecting parts is different from an interval between the first light collecting parts.

According to an embodiment of the present invention, wherein the first base is manufactured by a process comprising one of an extruding process or an injecting molding process.

According to an embodiment of the present invention, the first light collecting parts is manufactured by a process comprising one of an extruding process or an ultraviolet molding process.

According to an embodiment of the present invention, the first base and the first light collecting parts are provided as a single body by an extruding process.

According to an embodiment of the present invention, the light curing agent comprises a infrared cuing agent.

BRIEF DESCRIPTION OF THE DRAWINGS

Preferred embodiments of the present disclosure can be understood in more detail from the following description taken in conjunction with the accompanying drawings in which:

FIG. 7 illustrates a variation on the light controlling assembly according to an embodiment of the present invention;

FIG. 8 is a cross-sectional view of a light controlling assembly according to an embodiment of the present invention;

DETAILED DESCRIPTION OF PREFERRED EMBODIMENTS

Preferred embodiments of the present invention will be described in more detail with reference to the accompanying drawings. The present invention may, however, be embodied in many different forms and should not be construed as limited to the embodiments set forth herein.

An LCD 10 according to a first embodiment of the present invention will be described with reference to FIGS. 1 to 3.

Figure 1:
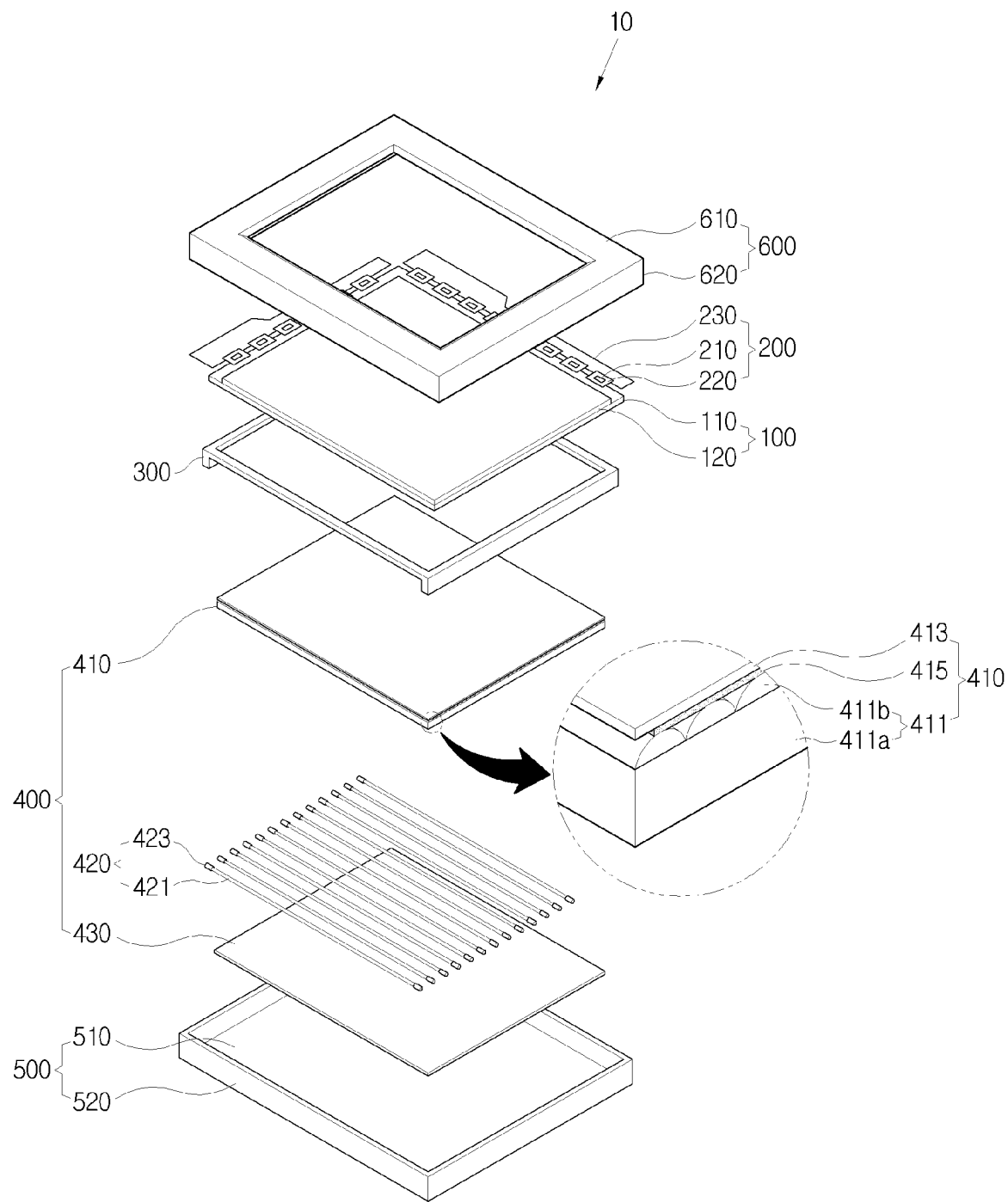
FIG. 1 is an exploded perspective view of an LCD according to an embodiment of the present invention.

Referring to FIG. 1, the LCD 10 comprises an LCD panel 100, a driver 200, a mold frame 300, a back light unit 400 a lower cover 500 and an upper cover 600.

The LCD panel 100 comprises a thin film transistor (TFT) substrate 110, a color filter substrate 120 facing the TFT substrate 110 and liquid crystals injected between the two substrates. The LCD panel 100 may further comprise front and rear polarizing plates which adhere to the front surface of the color filter substrate 120 and the rear surface of the TFT substrate 110 respectively so as to crossly polarize light passing through the LCD panel 100. The LCD panel 100 comprises liquid crystal cells formed in pixel units which are aligned in a matrix and form an image by adjusting the light transmittance of the cells according to an image signal delivered from the driver 200.

A plurality of gate lines and data lines are formed in a matrix on the TFT substrate 110, and TFTs are formed at intersections of the gate lines and the data lines. A signal voltage delivered from the driver 200 is applied between a pixel electrode and a common electrode of the color filter substrate 120 through the TFTs. Moreover, the liquid crystal cells between the pixel electrode and the common electrode are aligned to determine the light transmittance according to the signal voltage.

The color filter substrate 120 comprises a color filter layer where, for example, red, green and blue color filters or cyan, magenta and yellow filters are repeatedly formed with a black matrix as a boundary and the common electrode. The common electrode is made of a transparent conductive material such as, for example, indium tin oxide (ITO) or indium zinc oxide (IZO). The color filter substrate 120 has a smaller area than the TFT substrate 110.

The driver 200 is provided at one lateral side of the TFT substrate 110. The driver 200 comprises a flexible printed circuit board (FPCB) 210, a driving chip 220 seated on the FPCB 210 and a printed circuit board 230 connected to one lateral side of the FPBC 210. The driver 200 shown in FIG. 1 is a COF (chip on film) type. However, other types of drivers may be used, such as, for example, TCP (tape carrier package) or COG (chip on glass). The driver 200 comprises a terminal. The terminal of the driver 200 is mounted on the TFT substrate 110 to be connected to an end portion of the gate lines and an end portion of the data lines which extend on the TFT substrate 110 from a display region to a non-display region.

The mold frame 300 is formed along the edge of the LCD panel 100 and has a shape which is, for example, approximately rectangular. The mold frame 300 separates the LCD 100 from the backlight unit 400 and supports the LCD panel 100.

The LCD panel 100 does not emit light by itself, and thus the backlight unit 400 is disposed behind the mold frame 300 to provide light to the LCD panel 100. The backlight unit 400 comprises a light controlling assembly 410 disposed behind and parallel to the LCD panel 100, a light source 420 irradiating light to the rear of the LCD panel 100 through the light controlling assembly 410 and a reflective sheet 430 disposed between the light source 420 and the lower cover 500 and uniformly spreading the light from the light source 420 to face the rear of the LCD panel 100.

Figure 2:
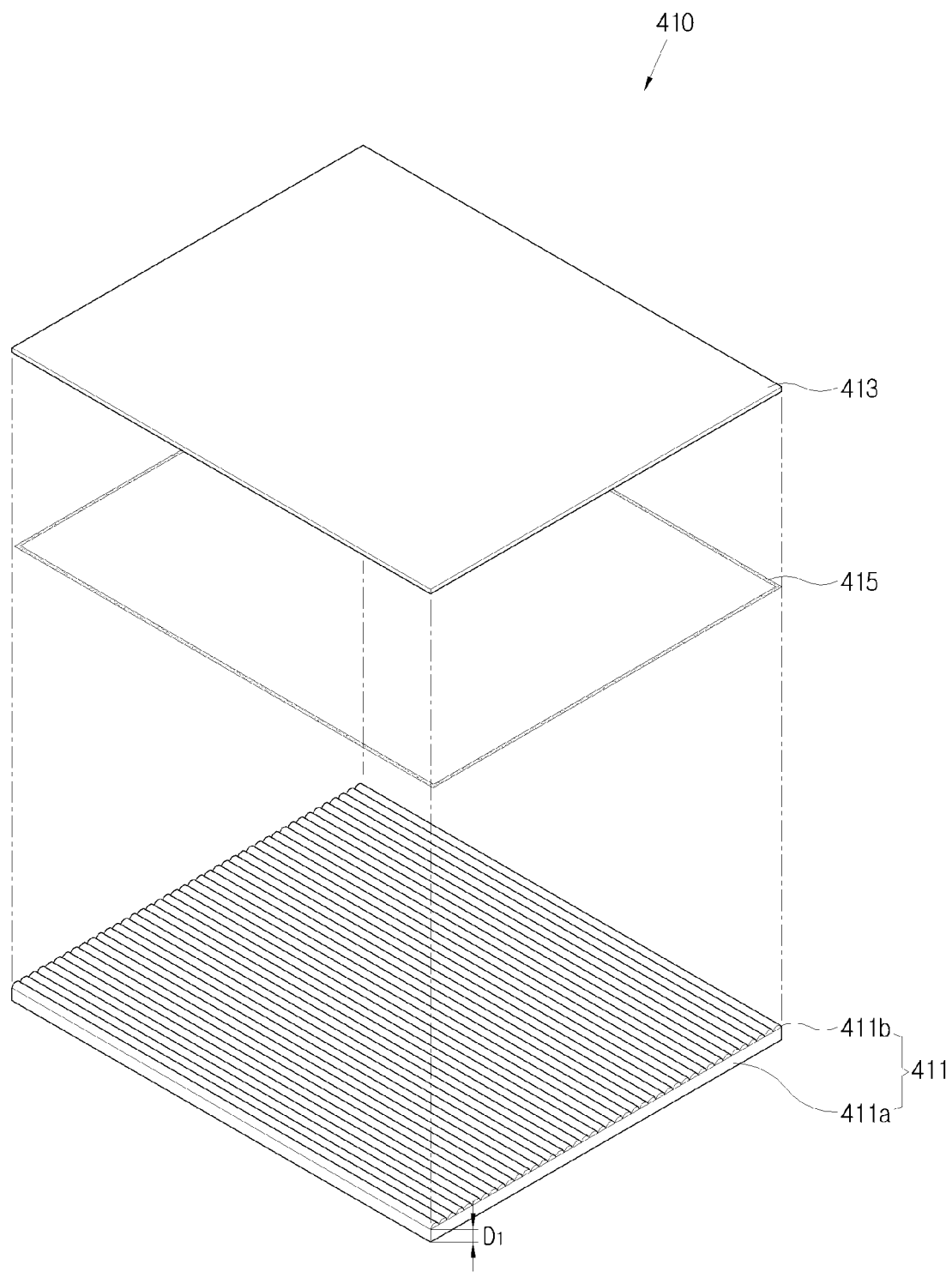
FIG. 2 is an exploded perspective view of a light controlling assembly according to an embodiment of the present invention.
Figure 3:
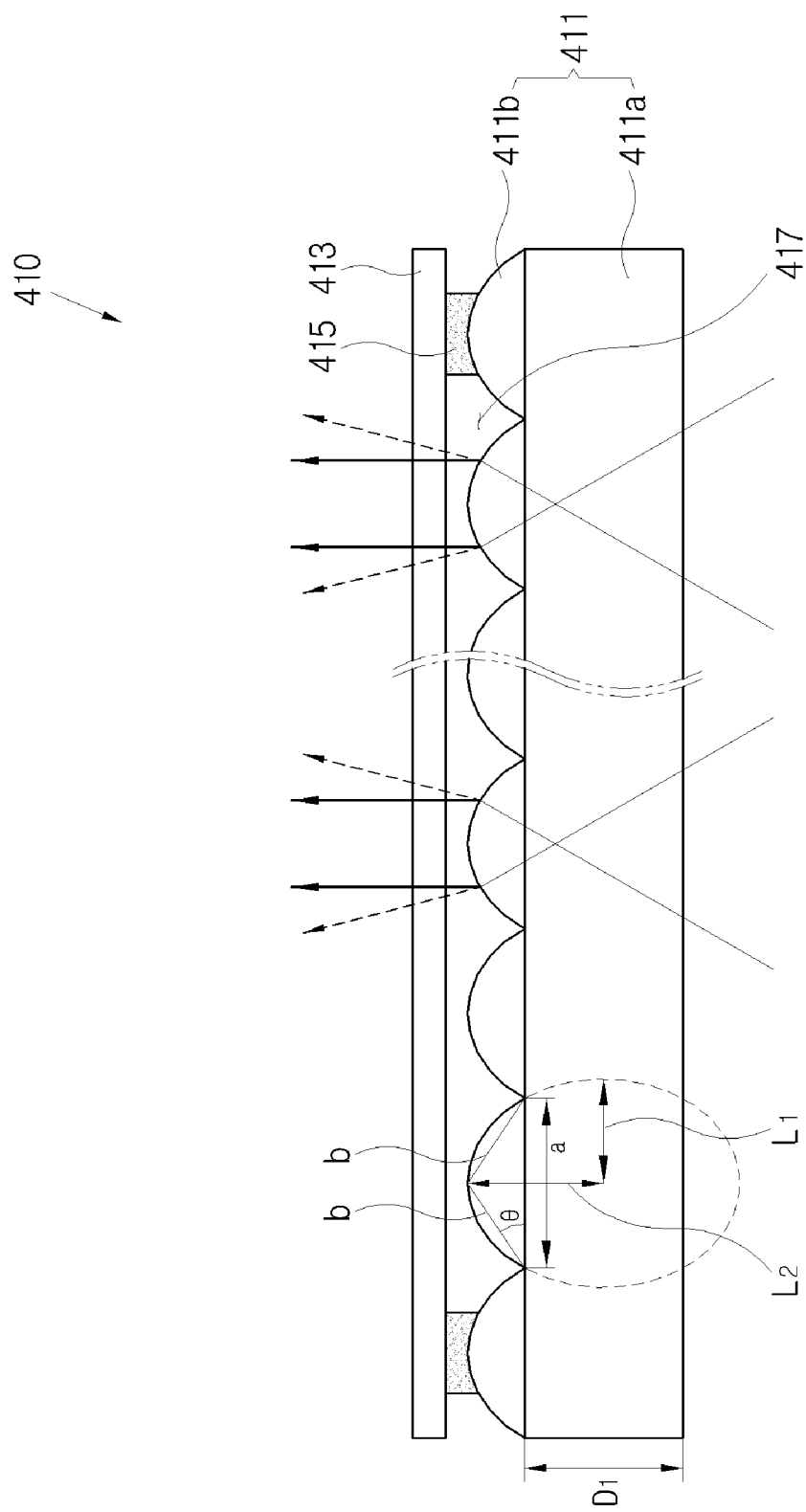
FIG. 3 is a cross-sectional view of the light controlling assembly taken along line III-III in FIG. 1.

Referring to FIGS. 2 and 3, the light controlling assembly 410 according to the first embodiment of the present invention comprises a first light controlling member 411 disposed in the lower part, a second light controlling member 413 disposed on the first light controlling member 411 and an infrared curing agent 415 disposed along the edge between the first light controlling member 411 and the second light controlling member 413 to adhere them to each other. An air layer 417 exists in an inner space formed by the infrared curing agent 415 between the first light controlling member 411 and the second light controlling member 413.

The first light controlling member 411 comprises a transparent base 411a and a light collecting part 411b provided on one surface of the base 411a toward the LCD panel 100.

For example, the base 411a may have a plate shape with a thickness D1 of about 1 millimeter (mm) to about 1.6 mm and may be made of, for example, an amorphous polymer. Alternatively, the base 411a may include, for example, thermoplastic resin or ultraviolet hardening resin. The thermoplastic resin, for example, may include at least one of poly methyl methacrylate (PMMA), polycarbonate (PC) and polystyrene (PS). The base 411a may not include a scattering agent so as to transmit light about 90 percent and more. However, the base 411a may have a small quantity of scattering agent to improve the uniformity of the light.

A plurality of light collecting parts 411b are disposed on the surface of the base 411a facing the LCD panel 100 and extend side by side in one direction. In the present embodiment, the light collecting parts 411b are disposed close to one another to contact one another without distance. In another embodiment, however, the light collecting parts 411b may be disposed at predetermined intervals.

A cross section of the light collecting parts 411b is, for example, convex-shaped. Alternatively, the collecting parts 411b may, for example, have a triangular prism shape with a rounded apex. In the cross section of the light collecting parts 411b as illustrated in FIG. 3, the bottom side a and a pair of oblique sides b extending from the opposite ends of the bottom side to the apex form an isosceles triangle. An angle θ between the bottom side a and the oblique side is about 38 degrees to about 44 degrees. The length of the bottom side a is about 50 micrometers (μm) to about 300 μm. The light collecting parts 411b form a portion of an oval including the circumference of the cross section of the light collecting parts 411b. For example, the cross section of the light collecting parts 411b is a portion of an oval. The short radius L1 to long radius L2 ratio is about 1.4 to about 1.7 in the oval.

The light collecting parts 411b include the same material as the base 411a to have the same refractivity as the base 411a. The light collecting parts 411b and the base 411a are manufactured as a single body by, for example, an extruding process. In the present embodiment, the first light controlling member 411 comprises the light collecting parts 411b but in other embodiments the first light controlling member 411 may not comprise the light collecting parts 411b.

The first light controlling member 411 with the aforementioned configuration has improved light transmittance and brightness as compared with a conventional diffusing plate or optical plate. The conventional optical plate without a light collecting part generally comprises a large amount of a diffusing agent therein. Light is volumetrically scattered by the diffusing agent in every direction while passing through the optical plate, thereby improving the uniformity of the light. However, some light may be absorbed to the diffusing agent to decrease the brightness of light provided to the LCD panel 100. Thus, the optical plate with a reflective polarizing film, a light collecting film and a diffusing film are employed to prevent a decrease in the brightness of the light provided to the LCS panel 100. In the present embodiment shown in FIG. 3, the light collecting parts 411b with the cross section of a portion of an oval reduces the traveling angle of the light, thereby improving the brightness. In detail, the light from the light source 420 passes through the base 411a and enters the light collecting parts 411b. The cross section of the light collecting parts 411b is, for example, convex-shaped. Thus, the light is specularly scattered on a surface of the light collecting parts 411b to decrease the traveling angle of the light and this light is provided to the LCD panel 100, thereby improving the brightness of the light on the LCD panel 100. Thus, as a result, a fewer number of the optical films, such as, for example, the reflective polarizing film, the light collecting film, the diffusing film need to be used. Further, as the base 411a is provided to be transparent without the diffusing agent or with a small amount of the diffusing agent, less light is absorbed to the diffusing agent, thereby preventing a decrease in the brightness of the light and also improving the light transmittance.

The second light controlling member 413 is provided as a diffusing film. The first light controlling member 411 does not comprise the diffusing agent to improve the light transmittance and the brightness of the light passing through the first light controlling member 411, so that uniformity of the light may decrease. Thus, the second light controlling member 413 of the diffusing film is deposited on the first light controlling member 411, thereby improving the uniformity of the light. FIGS. 2 and 3 illustrate only one second light controlling member 413, but a plurality of second light controlling members 413 may also be used. That is, two or more diffusing films may be deposited on the first light controlling member 411.

At least one reflective polarizing film and light collecting film may be employed as the second light controlling member 413. Each of a diffusing film, a reflective polarizing film and a light collecting film may be used independently or a combination thereof may be used as the second light controlling member 413. Table 1 illustrates combinations of elements for the first light controlling member 411 and the second light controlling member 413 as an example. However, the combinations below are only an example and may be modified variously. For example, in combination 1, three diffusing films are sequentially deposited on a light controlling member without a light collecting part 413 as a single body. The light controlling member and the diffusing films adhere to each other by an infrared curing agent 415.

TABLE 1

| | First light controlling member | Second light controlling member | | | Embodiment |
|---|---|---|---|---|---|
| Combination 1 | normal plate (without light collecting part) | diffusing film | diffusing film | diffusing film | |
| Combination 2 | normal plate (without light collecting part) | diffusing film | diffusing film | reflective polarizing film | |
| Combination 3 | normal plate (without light collecting part) | diffusing film | diffusing film | | |
| Combination 4 | normal plate (without light collecting part) | reflective polarizing film | | | |
| Combination 5 | optical plate (with light collecting part) | reflective polarizing film | | | |
| Combination 6 | optical plate (with light collecting part) | diffusing film | diffusing film | | |
| Combination 7 | optical plate (with light collecting part) | diffusing film | diffusing film | diffusing film | |
| Combination 8 | Normal plate (with light collecting part) | diffusing film | reflective polarizing film | | |
| Combination 9 | Normal plate (with light collecting part) | diffusing film | | | first embodiment |

Referring to FIG. 3, the first light controlling member 411 and the second light controlling member 413 according to the present embodiment are provided as a single body. In detail, the first light controlling member 411 and the second light controlling member 413 are provided as a single body by the infrared curing agent 415 disposed along the edges of the first light controlling member 411 and the second light controlling member 413.

The infrared curing agent 415 is, for example, a mixture of a resin and an additive reacting to infrared rays. The additive is activated when being irradiated by the infrared rays, so that the infrared curing agent 415 momentarily becomes about 400° C. or more. Thus, a surface of the first light controlling member 411 and the second light controlling member 413 which are in contact with the infrared curing agent 415 become partially melted by the temperature of the infrared curing agent 415. In this state, the first and the second light controlling member 411 and 413 are pressed and the infrared curing agent 415 is cured, thereby adhering the first and the second light controlling members 411 and 413 to each other.

The infrared curing agent 415 adheres the first and the second light controlling members 411 and 413 to each other using a momentary high temperature, and thus the adhesive strength provided by the infrared curing agent 415 is improved. Thus, although the infrared curing agent 415 is applied only on the edges of the first and the second light controlling members 411 and 413, a sufficient adhesive strength may still be obtained. Alternatively, the infrared curing agent 415 may also be formed locally in a middle part of the light controlling members 411 and 413. In another embodiment, in the case that the second light controlling member 413 comprises a plurality of optical films, such as, for example, a diffusing film, a reflective polarizing film, a light collecting film, the films of the second light controlling member 413 may be adhered to each other by an infrared curing agent disposed along the edges of the optical films. Further, in another embodiment, the infrared curing agent 415 may be formed discontinuously along the optical films.

Accordingly, the light controlling assembly 410 is provided as a unit with a predetermined thickness. A process for treating the thin film thickness of the diffusing film, the light collecting film and the reflective polarizing film is modulated such that they may be used in an automated process. Further, elements in the light controlling assembly 410 are provided as a single unit, thereby reducing the process time for a module assembly process.

Figure 4:
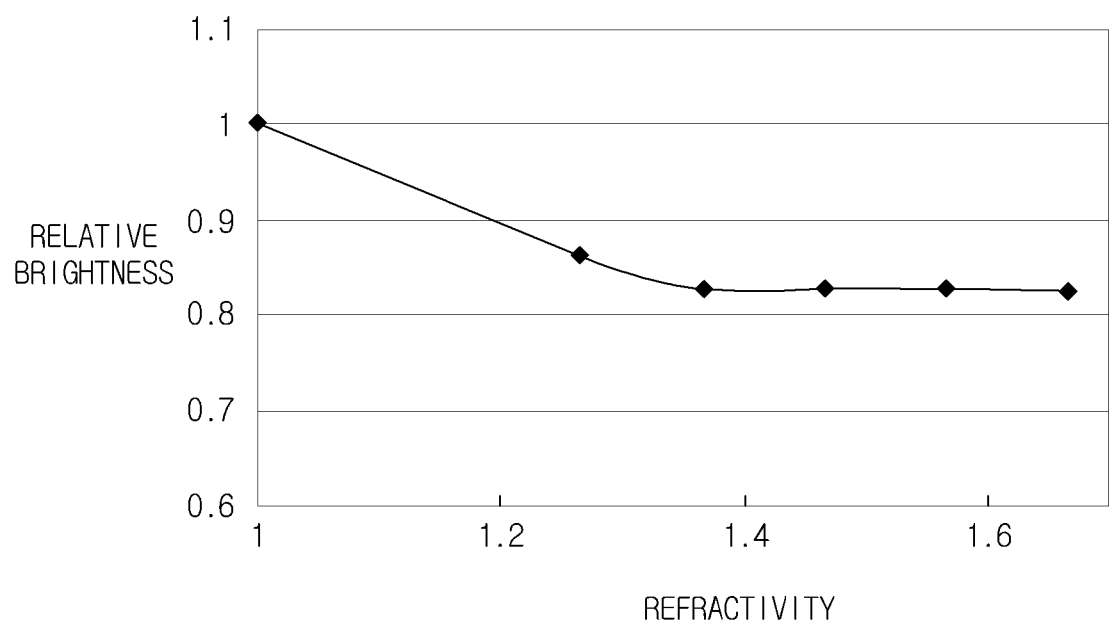
FIG. 4 is a graph to illustrate a principle of brightness increase in the light controlling assembly according to an embodiment of the present invention.

The air layer 417 is provided in the inner space formed by the infrared curing agent 415 between the first light controlling member 411 and the second light controlling member 413. Conventionally, the first light controlling member 411 and the second light controlling member 413 are adhered to each other by an adhesive agent, thereby providing the light controlling assembly 410 as a single body. However, the light from the light source 420 may decrease in light transmittance and brightness due to the adhesive agent while passing through the light controlling assembly 410. As illustrated in FIG. 4, when light passes through a material having a refractivity over 1, the brightness of the light generally decreases. For example, the adhesive agent has a refractivity of over 1.

In the light controlling assembly 410 according to the present embodiment, the infrared curing agent 415 is disposed along the edge between the first light controlling member 411 and the second light controlling member 413. For example, the infrared curing agent 415 is disposed outside an active area where images are formed. The air layer 417 is disposed between the first light controlling member 411 and the second light controlling member 413 in the active area. As the refractivity of the air layer 417 is 1, the brightness of light passing through the air layer 417 does not decrease.

The light source 420 comprises a light source body 421 to emit light and a light source electrode 423 formed at an end portion and is provided with power from an inverter. A plurality of light sources 420 are arranged parallel with each other on the entire rear surface of the LCD panel 100. A Cold Cathode Fluorescent Lamp (CCFL) or an External Electrode Fluorescent Lamp (EEFL) which has high brightness, low cost and low consuming power and drives a plurality of light sources with one inverter may be used for the light sources 420. In the case that a portion of the light sources 420 extend in one direction, the light sources 420 may be disposed parallel with an extending direction of the light collecting part 413.

Alternatively, a Flat Fluorescent Lamp (FFL) which uniformly shines on its surface may be used as the light sources 420. The FFL has high brightness and brightness uniformity, consumes less power and has a longer life as compared with conventional light sources. Also, a light emitting diode (LED) with high brightness and sufficient color reproducibility may be used as the light sources 420.

The reflective sheet 430 is disposed between the light sources 420 and the lower cover 500 to reflect the light from the light sources 420 to be provided toward the light controlling assembly 410. The reflective sheet 430 may include, for example, polyethylene terephthalate (PET) or polycarbonate (PC). The reflective sheet 430 adheres to a bottom surface of the lower cover 500.

The lower cover 500 comprises a bottom side 510 disposed parallel with the LCD panel 100 and a lateral wall 520 bent upward from the bottom side 510 to form an accommodating space where the backlight is accommodated.

The upper cover 600 comprises a front part 610 having a display window to expose an available surface of the LCD panel 100 and a lateral part 620 bent downward from the front part 610 and is coupled to the lower cover 500 covering the LCD panel 100, the mold frame 300 and the lateral wall 520 of the lower cover 500.

Hereinafter, second to fourth embodiments of the present invention will be described with reference to drawings. It should be noted that the following description will be made to only to those features which are different from those features of the first embodiment, and thus a description of the remaining similar features to the first embodiment will not be repeated herein.

Figure 5:
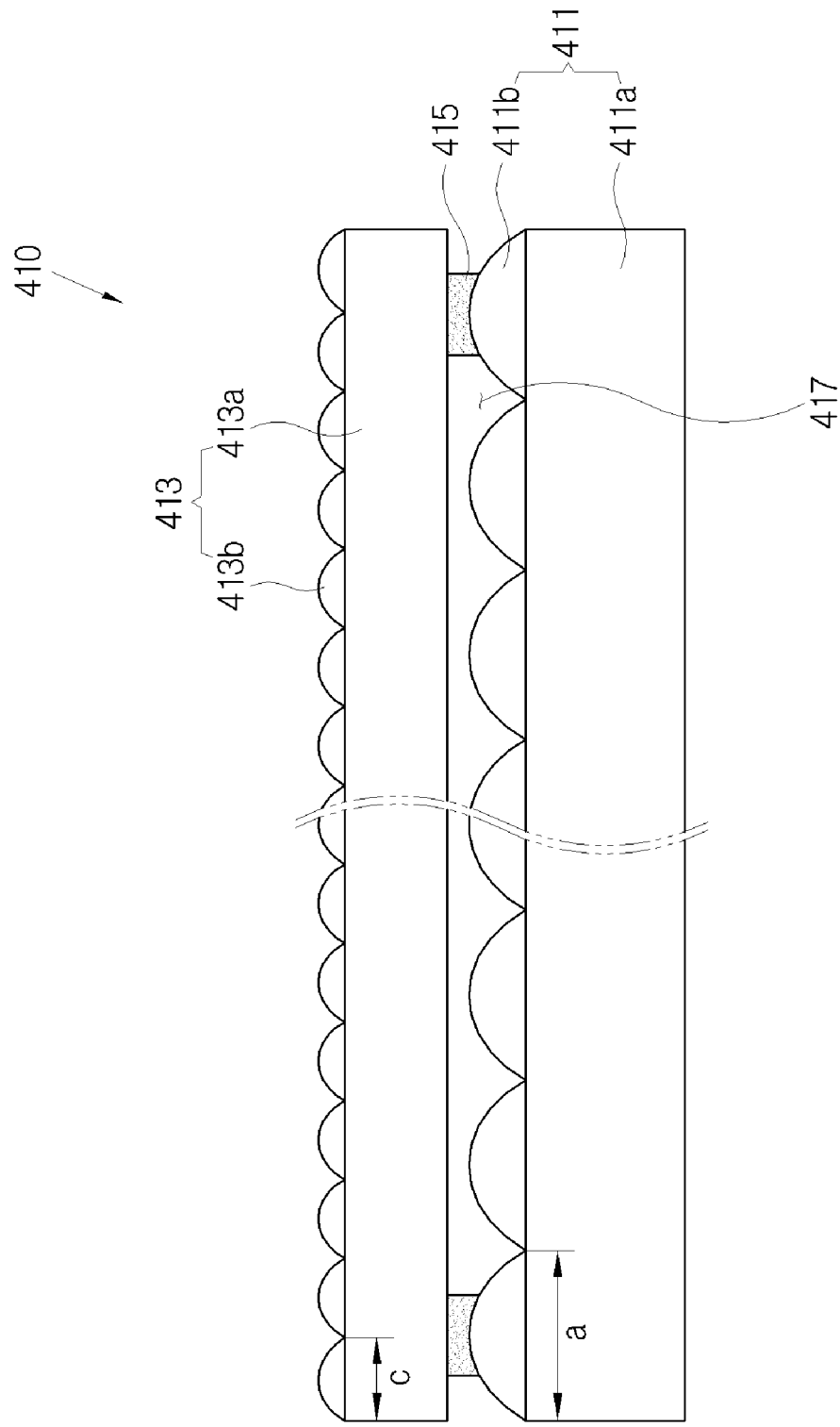
FIG. 5 illustrates a structure of a light controlling assembly according to an embodiment of the present invention.

A second embodiment of the present invention will be described with reference with FIG. 5. Referring to FIG. 5, a light controlling assembly 410 comprises a first light controlling member 411 and a second light controlling member 143 deposited on the first light controlling member 411 and having the same structure as the first light controlling member 411. For example, the first light controlling member 411 comprises a first base 411a and a light collecting part 411b, and the second light controlling member 413 comprises a second base 413a and a second light collecting part 413b.

Regarding a cross section of the light collecting parts 411b and 413b, the length a of a bottom side of the first light collecting part 411b is different from the length c of a bottom side of the second light collecting part 413b. As illustrated in FIG. 5, the bottom side of the cross section of the first light collecting part 411b is longer than the bottom side of the cross section of the second collecting part 413b, e.g., a is longer than c., because when the first light collecting part 411b and the second light collecting part 413b have the same size, moiré may be generated to deteriorate optical characteristics. In one embodiment, the length of a bottom side of any one between the first and the second light collecting parts may be a multiple of the other one length of a bottom side. For example, in the case that the length a of the first light collecting part 411b is about 50 micrometer (μm), the length c of the second light collecting part 413 may be about 100 μm or about 200 μm.

Figure 6A:
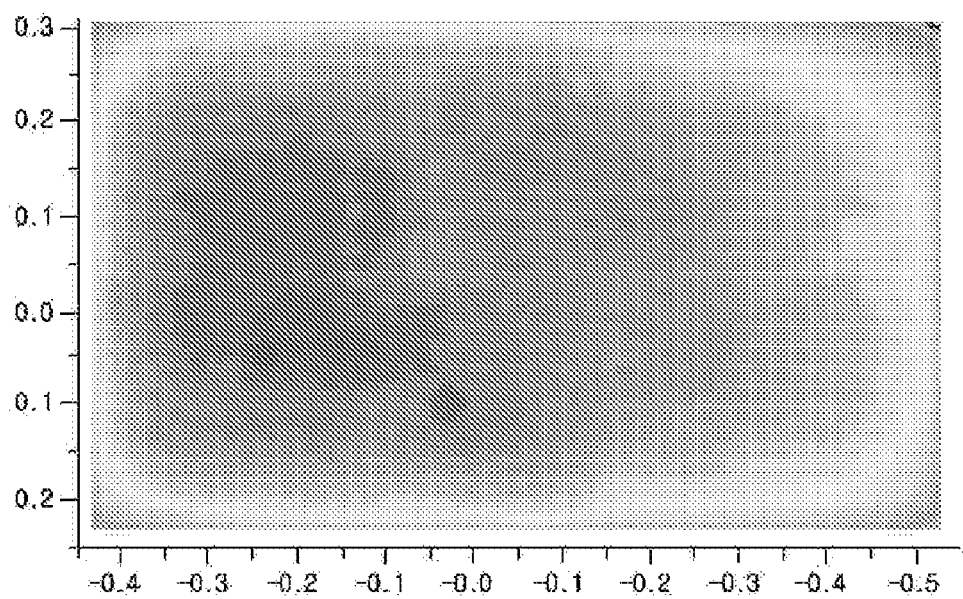
FIGS. 6A and 6B are graphs to illustrate profiles of light in light controlling assemblies according to a conventional invention and an embodiment of the present invention.
Figure 6B:
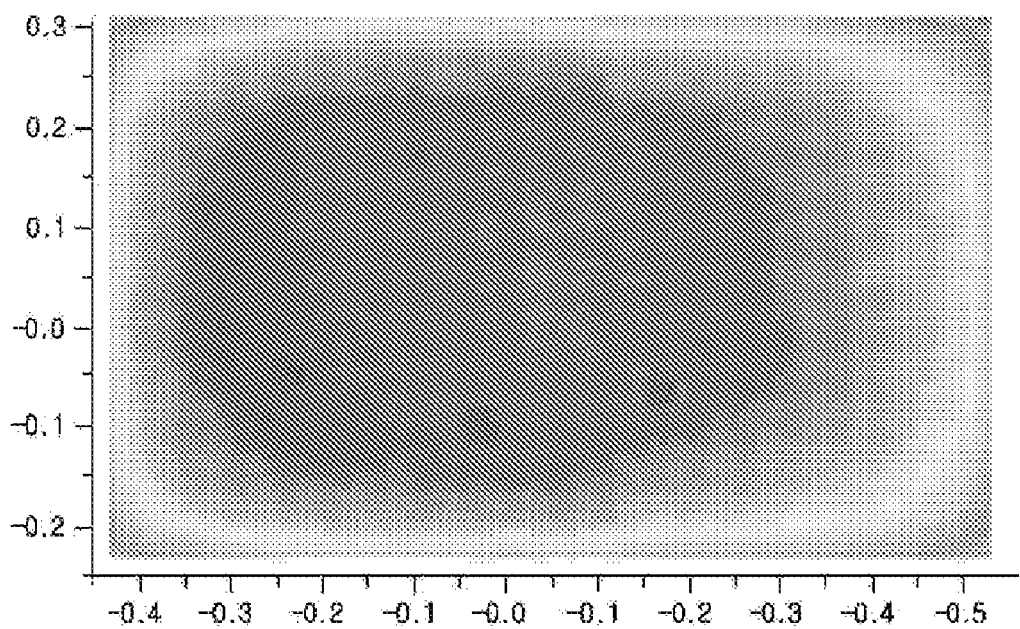

FIG. 6A illustrates a light profile of a light controlling member without a light collecting member, and FIG. 6B illustrates a light profile of the light controlling assembly 410 where the first light controlling member 411 and the second light controlling member 413 are provided as a single body. In FIGS. 6A and 6B, the darker the tone of the color is, the higher the brightness is and the broader the inner area defined by a white outline is, the wider the light spreads. Referring to FIGS. 6A and 6B, the fact that the light profile is wider and the tone of the color is darker in FIG. 6B as compared with FIG. 6A means that the brightness of the light is improved.

Alternatively, the light controlling assembly 410 according to the second embodiment comprises at least one diffusing film, reflective polarizing film and light collecting film. Here, the diffusing film may be provided as a micro array lens shape diffusing film 419 in FIG. 7. The micro array lens shape diffusing film 419 comprises a plurality of lens arranged on a surface which does not face the second light controlling member 413 to thereby improve the brightness.

Table 2 below shows the brightness under a light controlling member without a light collecting part and with at least one diffusing film, under the light controlling assembly 410 according to the second embodiment, under the light controlling member 410 according to the second embodiment with at least one diffusing film and under the light controlling assembly illustrated in FIG. 7.

Table 2 is described below. An exemplary reference and exemplary experiments 1 and 2 employ a plate without a light collecting part 411b as the first light controlling member 411. Exemplary experiments 3 through 6 employ the first light controlling member 411 according to the present embodiment. In the exemplary reference and the exemplary experiments 1 and 2, the light controlling assembly 410 is made by depositing at least one diffusing film on the first light controlling member 411, and applying an adhesive agent between the first light controlling member 411 and the diffusing film and between a plurality of diffusing films. In exemplary experiments 3 through 6, an optical plate according to the second embodiment is used for the second light controlling member 413 and the infrared curing agent 415 adheres the first light controlling member 411 to the second light controlling member 413. Exemplary experiment 3 does not employ a diffusing film, exemplary experiment 2 employs one diffusing film, and exemplary experiment 5 employs two diffusing films. The infrared curing agent 415 is interposed between the second light controlling member 413 and the diffusing film and between the diffusing films. Exemplary experiment 6 employs the micro array lens shape diffusing film 419 adhering to the second light controlling member 413.

In the exemplary experiment 6 shown in FIG. 7, the infrared curing agents 415 are not fully overlapped each other, which makes it possible to cure the both of the infrared curing agents 415 by irradiating light ray only from one direction. In addition the infared curing agents 415 have different width.

Table 2 shows the brightness in each case and each relative brightness on the basis of the brightness in the exemplary reference.

TABLE 2

| Structure of light controlling assembly | Exemplary reference | Exemplary experiment 1 | Exemplary experiment 2 | Exemplary experiment 3 | Exemplary experiment 4 | Exemplary experiment 5 | Exemplary experiment 6 |
|---|---|---|---|---|---|---|---|
| first light controlling member | Normal plate (without light collecting part) | | | Optical plate (with light collecting part) | | | |
| Second light controlling member | X | | | Optical plate (with light collecting part) | | | |
| Diffusing film | O | O | O | X | O | O | O (micro array lens) |
| Diffusing film | O | O | X | X | X | O | X |
| Diffusing film | O | X | X | X | X | X | X |
| Brightness | 10350 | 9860 | 8590 | 10720 | 11130 | 10910 | 11500 |
| Relative brightness | 100% | 95.27% | 83.00% | 103.57% | 107.54% | 105.41% | 111.11% |

As illustrated in table 2, the brightness is improved in the third to the sixth embodiments. In the third to the sixth embodiments, the light controlling assembly 410 according to the second embodiment is used. In detail, the brightness increases by about 5% to about 7% when the light controlling assembly 410 comprises at least one diffusing film in the exemplary experiments 3 through 5, and by about 10% when the light controlling assembly 410 comprises the micro array lens shape diffusing film 419 in the exemplary experiment 6. The micro array lens shape diffusing film 419 has a pattern having silimar shape to the second light collecting part 413b. However, the pattern of the mirco array lens shape diffusing film 419 has smaller pitch than the second light collecting part 413b.

Hereinafter, the third embodiment of the present invention will be described with reference to FIG. 8. FIG. 8 illustrates the structure of a base 411a. For example, the base 411a comprises a core layer 412a and an antistatic layer 412b formed between the core layer 412a and a light collecting parts 411b. The base 411a may further comprise an ultraviolet blocking layer 412c formed on a lower surface of the core layer 412a, and a plurality of protrusions 412d may further be formed on a lower surface of the ultraviolet blocking layer 412c. The protrusions 412d may be of, for example, a half sphere shape. The protrusions 412d with this configuration scatters the light from the light source 420 having directivity, thereby improving the brightness of the light. Further, the protrusions 412d prevent damage to the light controlling assembly 410 and the light source 420 by friction therebetween.

Hereinafter, a fabrication method of the light controlling assembly according to the first embodiment of the present invention will be described with reference to FIGS. 9 through 12.

Figure 9:
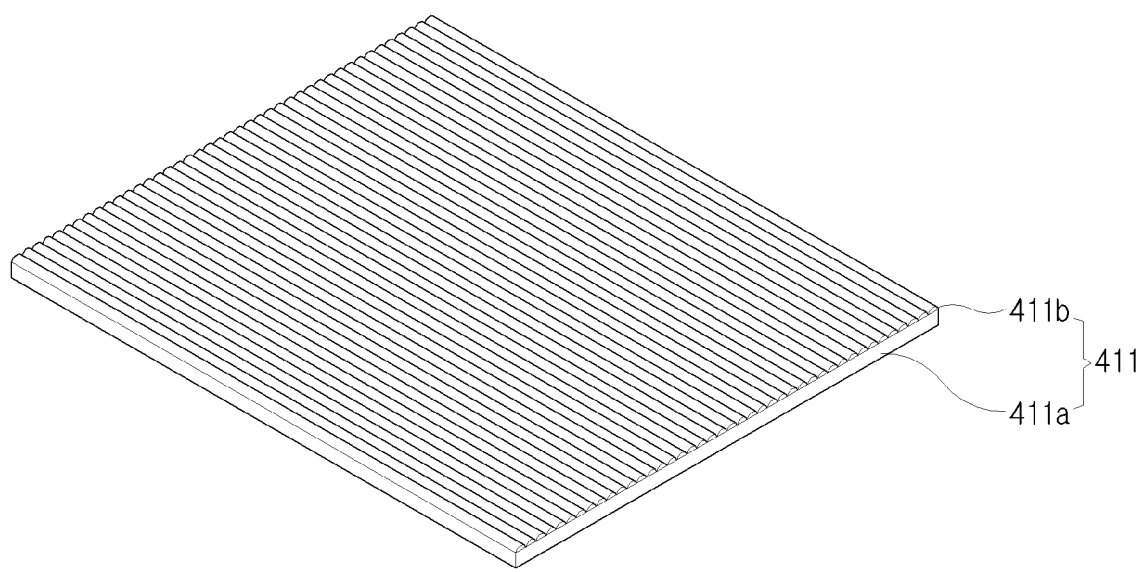
FIGS. 9 to 12 illustrate a fabrication method of the light controlling assembly according to an embodiment of the present invention.

Referring to FIG. 9, the first light controlling member 411 according to the first embodiment of the present invention is prepared. The first light controlling member 411 comprises the transparent base 411a and the light collecting part 411b provided on one surface of the base 411a.

The base 411a is provided as a plate with a thickness D1 of about 1 mm to about 1.6 mm by using, for example an extruding process or an injecting molding process. The base 411a is made of, for example, an amorphous polymer. Alternatively, the base 411a may include, for example, a thermoplastic resin or an ultraviolet hardening resin. The thermoplastic resin, for example, may include at least one of poly methyl methacrylate (PMMA), polycarbonate (PC) and polystyrene (PS).

The light collecting part 411b is manufactured by, for example, an extruding process or an ultraviolet molding process. The ultraviolet molding process is described below. A mold with an intaglio pattern of the light collecting part 411b is provided, and a light collecting material of ultraviolet curing resin is applied to the mold. Then, the light collecting material is pressed by the base 411a of a plate shape and irradiated with an ultraviolet ray passed the base 411a. The light collecting material is cured by the ultraviolet ray, thereby forming the light collecting part 411b and adhering the light collecting part 411b to the base 411 at the same time.

Meanwhile, the base 411a and the light collecting part 411b may be formed as a single body at the same time by an extruding process.

Figure 10:
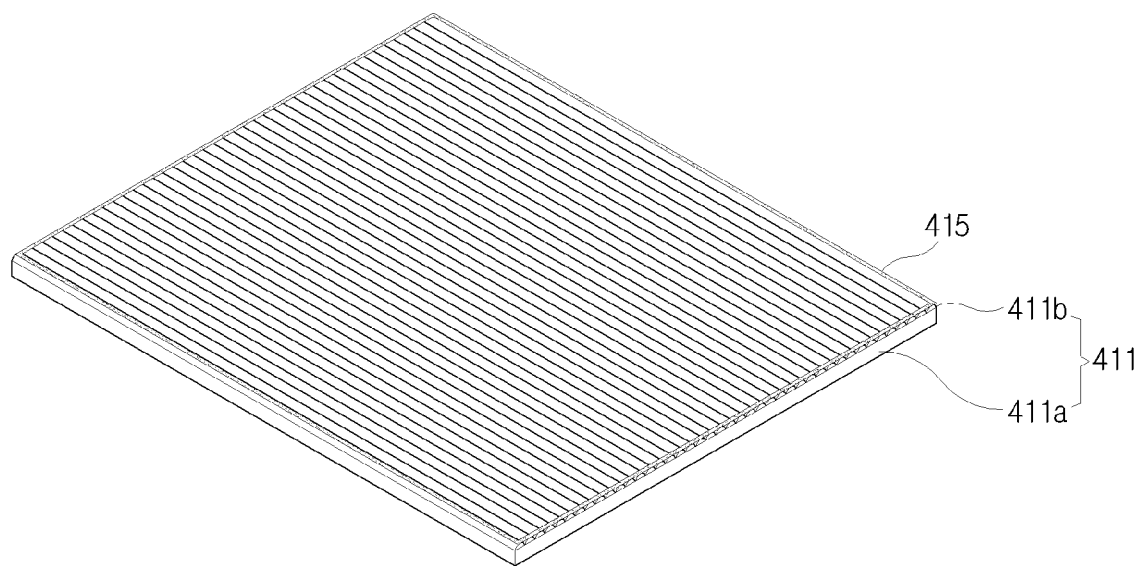

Referring to FIG. 10, the infrared curing agent 415 is applied to the edge of the first light controlling member 411. The infrared curing agent 415 may be formed in a successive line along the edge of the first light controlling member 411. Alternatively, the infrared curing agent 415 may be formed discontinuously along the edge. For example, the infrared curing agent 415 is formed dottedly.

Figure 11:
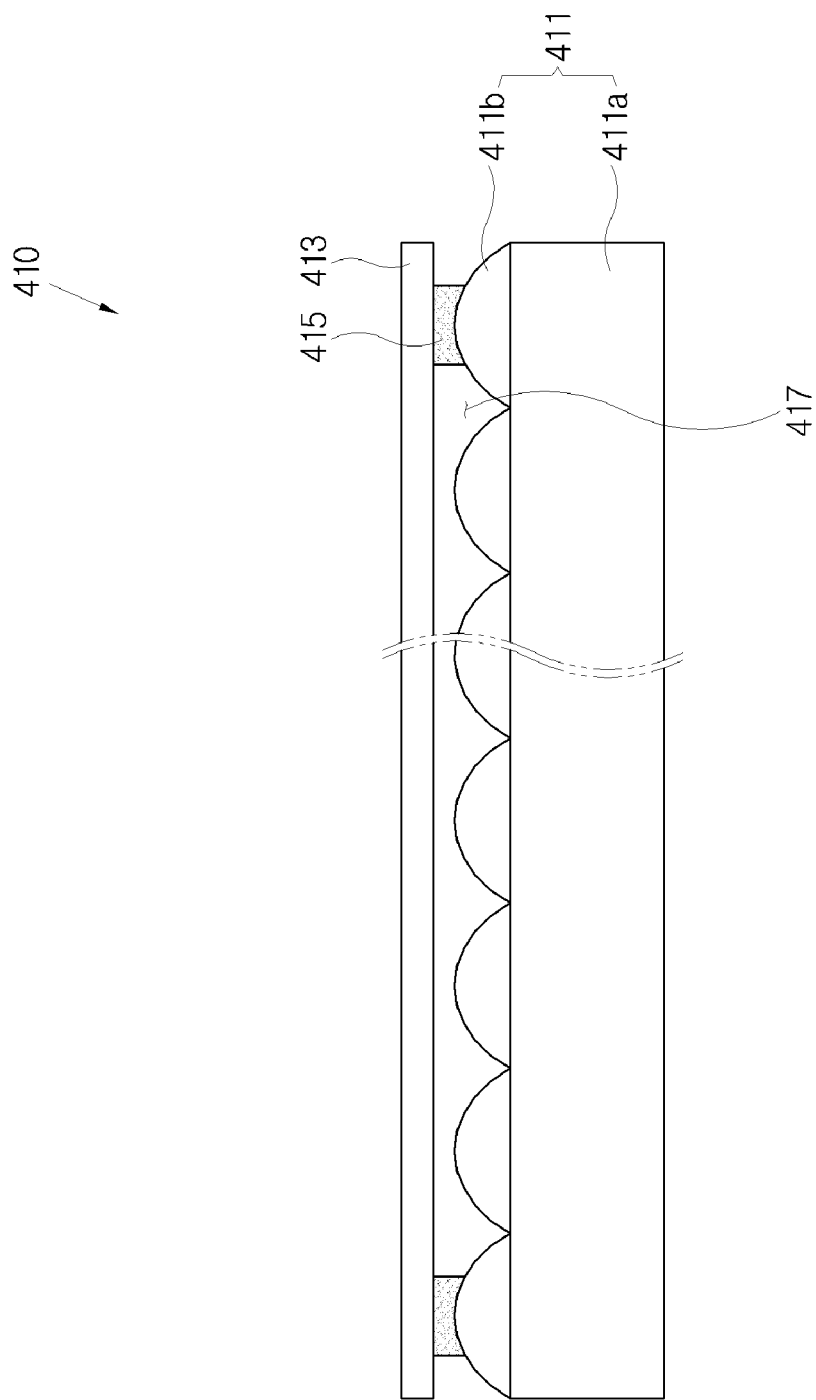

Referring to FIG. 11, the second light controlling member 413 is deposited on one surface of the first light controlling member 411 where the infrared curing agent 415 is formed. Here, the second light controlling member 413 may comprise at least one of the diffusing film, the reflective polarizing film and the light collecting film. Also, a plurality of diffusing films, reflective polarizing films and light collecting films may be used.

As above-described in the second embodiment, the second light controlling member 413 has the same configuration as the first light controlling member 411. For example, as shown in FIG. 5, the first light controlling member 411 may comprise the first base 411a and the first light collecting part 411b, and the second light controlling member 413 may comprise the second base 413a and the second light collecting part 413b. In this case, it is preferred that the length a of the bottom side of the first light collecting part 411b is different from that c of the second light collecting part 413c in the cross section to minimize deterioration of the optical characteristics due to the moiré.

Figure 12:
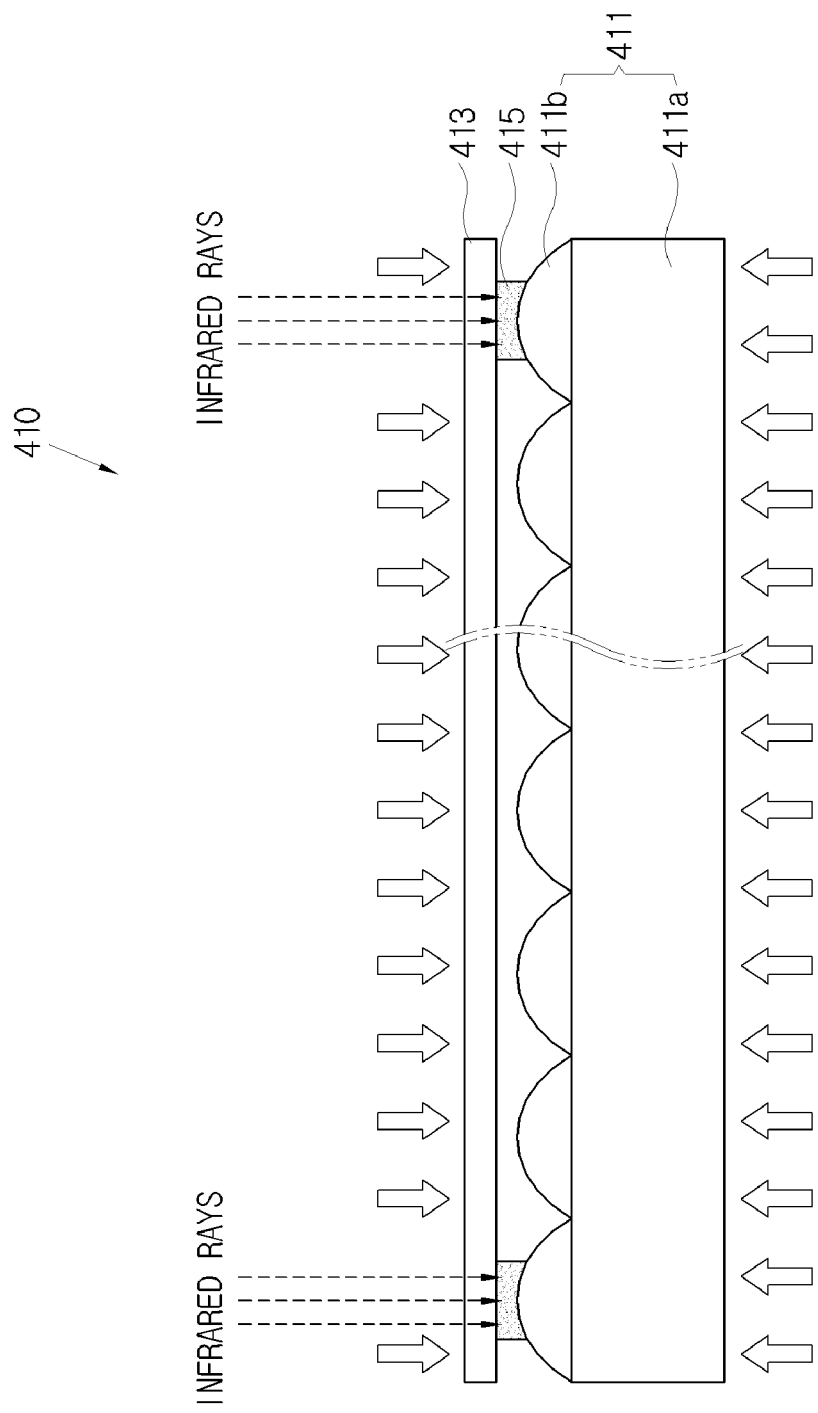

Referring to FIG. 12, the infrared curing agent 415 is irradiated with infrared rays to press the first light controlling member 411 and the second light controlling member 413 to adhere to each other.

Next, a mechanism illustrating how the first light controlling member 411 and the second light controlling member 413 are adhered to each other by the infrared curing agent 415 will be described with reference to FIGS. 13A through 13D.

Figure 13A:
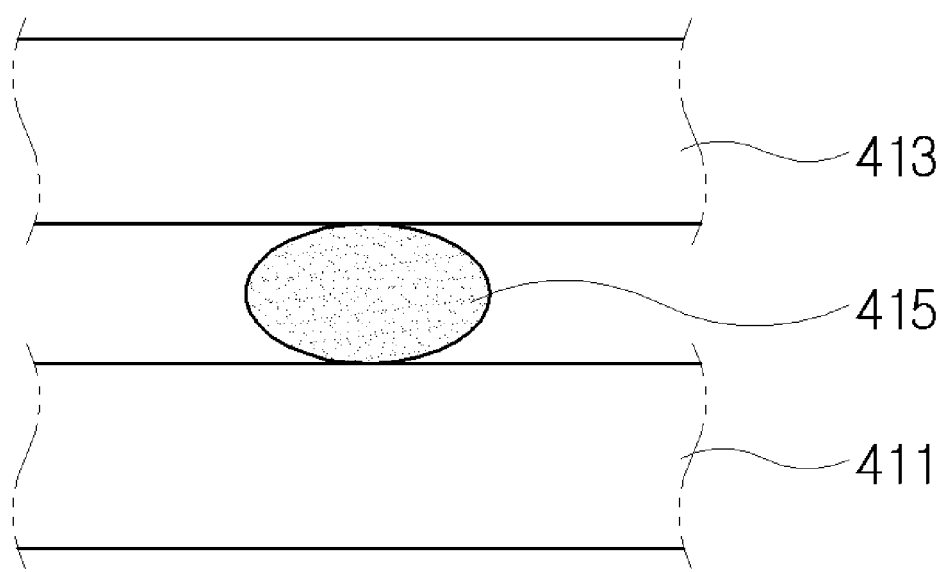
FIGS. 13A through 13D illustrate process of curing an infrared curing agent.
Figure 13B:
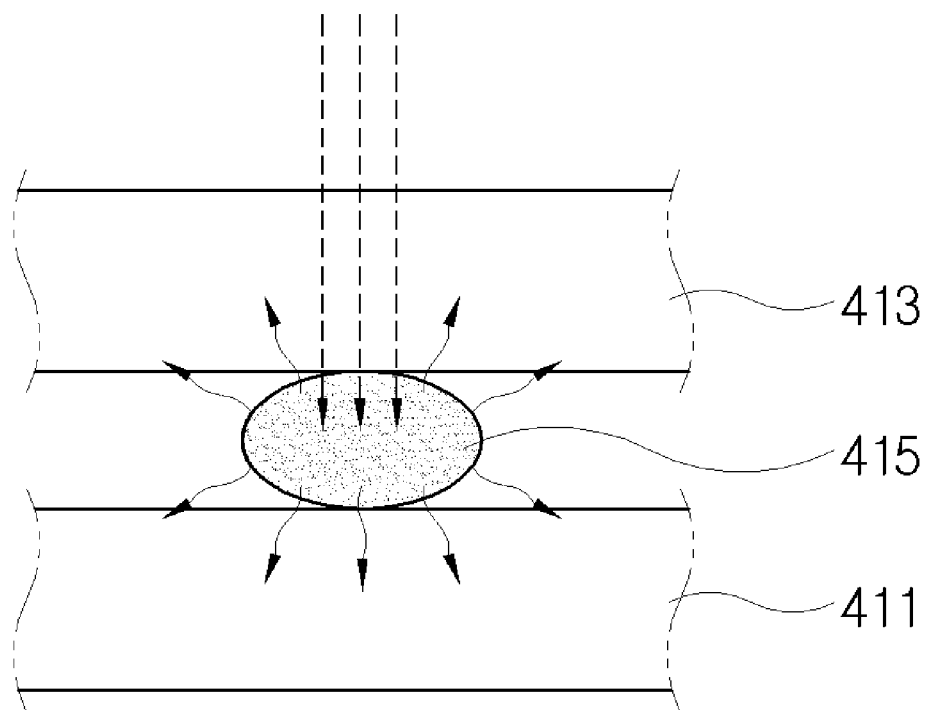
Figure 13C:
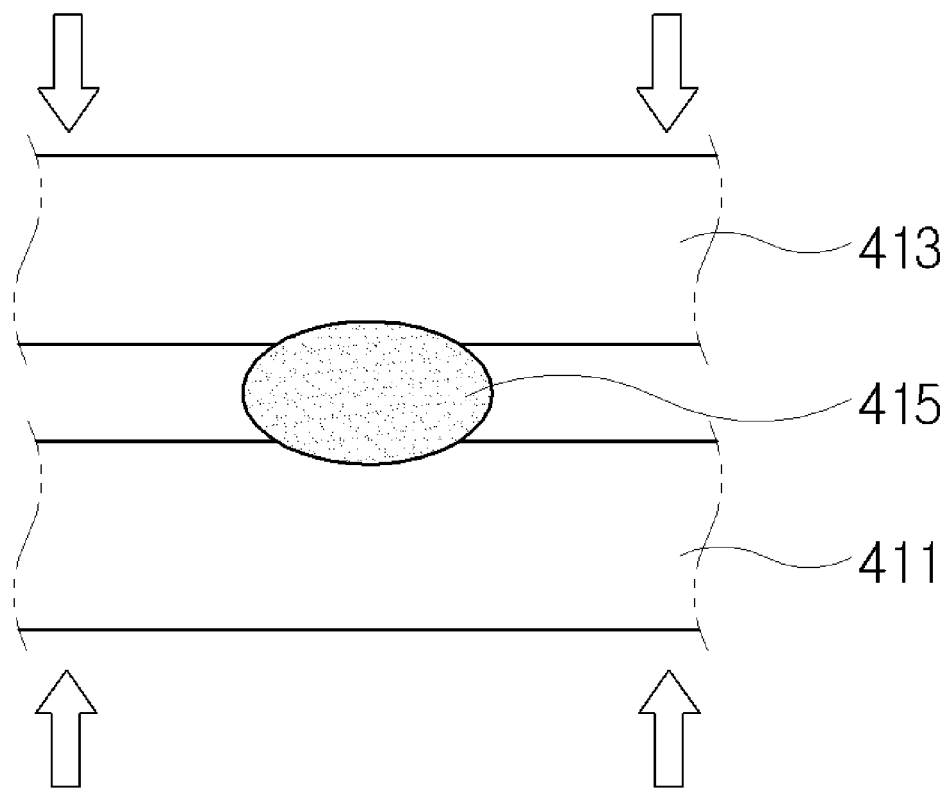
Figure 13D:
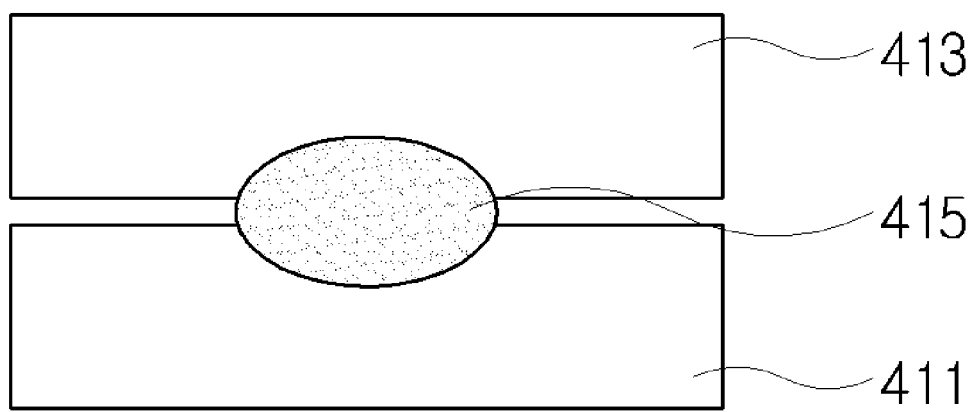

The infrared curing agent 415 is a mixture of, for example, a resin and an additive reacting to infrared rays. Referring to FIG. 13A, the additive is activated by irradiation of the infrared rays, so that the infrared curing agent 415 momentarily becomes about 400° C. or more. For example, referring to FIG. 13B, the infrared curing agent 415 absorbs the infrared rays to emit heat. Accordingly, referring to FIG. 3C, a surface of the first light controlling member 411 and the second light controlling member 413 which is contact with the infrared curing agent 415 become partially melted by the temperature of the infrared curing agent 415. In this state, referring to FIG. 13D, the first and the second light controlling members 411 and 413 are pressed to be closer to each other. Then, the infrared curing agent 415 losing heat is cured, thereby adhering the first and the second light controlling members 411 and 413 to each other.

In the present invention the infraed curing agent 415 is only an example of a light curing agent. The light curing agenet may be cured by light rays having wavelength of 400 nanometer (nm) to 800 nanometer (nm). Accordingly, the light controlling assembly 410 is provided as a unit having a predetermined thickness. A process treating the thin film thickness of the diffusing film, the light collecting film and the reflective polarizing film is modulated such these elements of the light controlling assembly 410 may be treated in an automated process. Further, the elements of the light controlling assembly 410 are provided as a single unit, thereby reducing the process time in a module assembly process.

According to an embodiment of the present invention, a light controlling assembly is provided which may improve the brightness of light and which may be readily employed in an automated process. In addition, a fabrication method of the same and an LCD having the same are also provided.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A liquid crystal display comprising:
a liquid crystal display panel;
a light source to provide light to the liquid crystal display panel; and
a light controlling assembly disposed between the light source and the liquid crystal display panel, the light controlling assembly comprising at least one first light controlling member, at least one second light controlling member disposed on the first light controlling member and an light curing agent disposed on an edge part between the first light controlling member and the second light controlling member to adhere the first light controlling member and the second light controlling member to each other, the first light controlling member and the second light controlling member having an air layer therebetween.

2. The liquid crystal display according to claim 1, wherein the first light controlling member comprises a transparent base and light collecting parts provided on one surface of the base toward the liquid crystal display panel, the light collecting parts being disposed parallel to each other, extending in one direction, and comprising one of convex or triangular cross sections.

3. The liquid crystal display according to claim 2, wherein the second light controlling member comprises the same configuration as the first light controlling member and is different from the first light controlling member in the length of a bottom side of the cross section of the light collecting parts.

4. The liquid crystal display according to claim 2, wherein the base comprises a core layer and an antistatic layer formed between the core layer and the light collecting parts.

5. The liquid crystal display according to claim 4, wherein the base further comprises an ultraviolet blocking layer which faces the light source and is disposed on a lower surface of the core layer.

6. The liquid crystal display according to claim 2, wherein a plurality of protrusions is further formed on one surface of the base facing the light source.

7. The liquid crystal display according to claim 2, wherein a thickness of the base is in a range from about 1 millimeter (mm) to about 1.6 mm.

8. The liquid crystal display according to claim 1, wherein the light curing agent comprises infrared curing agent.

9. The liquid crystal display according to claim 1, wherein the infrared curing agent is formed by being cured by light ray having a wavelength of 400 nanometer (nm) to 800 nanometer (nm) and heated over about 400° C. in temperature.

10. The liquid crystal display according to claim 1, wherein the light curing agent is discontinuously formed.

11. The liquid crystal display according to claim 2, wherein at least a portion of the light source extends in one direction, and the light collecting parts are disposed parallel with an extending direction of the light source.

12. The liquid crystal display according to claim 1, wherein the second light controlling member comprises a lower second light controlling member which faces the first light controlling member and a upper second light controlling member, the light controlling assembly further comprises an additional light curing agent disposed on an edge part of the lower light controlling member and the upper light controlling member and at least a part of the light curing agent does not overlap the additional light curing agent.

13. The liquid crystal display according to claim 1, wherein the second light controlling member comprises a lower second light controlling member which faces the first light controlling member and a upper second light controlling member, the light controlling assembly further comprises an additional light curing agent disposed on an edge part of the lower light controlling member and the upper light controlling member and the light curing agent and the additional light curing agent have different width.

14. The liquid crystal display according to claim 1, wherein the second light controlling member comprises a lower second light controlling member which faces the first light controlling member and a upper second light controlling member, the upper second light controlling member comprising a micro array lens and the light controlling assembly further comprises an additional light curing agent disposed on an edge part of the lower light controlling member and the upper light controlling member.

* * * * *